US010977137B2

(12) United States Patent
Bagchi et al.

(10) Patent No.: US 10,977,137 B2
(45) Date of Patent: *Apr. 13, 2021

(54) INTELLIGENT LOG GAP DETECTION TO ENSURE NECESSARY BACKUP PROMOTION

(71) Applicant: EMC IP Holding Company LLC, Hopkinton, MA (US)

(72) Inventors: Krishnendu Bagchi, Bangalore (IN); Shelesh Chopra, Bangalore (IN); Bharat Bhushan, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 170 days.

This patent is subject to a terminal disclaimer.

(21) Appl. No.: 16/041,929

(22) Filed: Jul. 23, 2018

(65) Prior Publication Data

US 2020/0026622 A1    Jan. 23, 2020

(51) Int. Cl.
*G06F 11/14* (2006.01)
*G06F 11/20* (2006.01)
*G06F 16/23* (2019.01)

(52) U.S. Cl.
CPC ...... *G06F 11/1471* (2013.01); *G06F 11/1451* (2013.01); *G06F 11/2023* (2013.01); *G06F 16/2365* (2019.01); *G06F 2201/80* (2013.01); *G06F 2201/82* (2013.01)

(58) Field of Classification Search
None
See application file for complete search history.

(56) References Cited

U.S. PATENT DOCUMENTS

| 5,481,694 | A | * | 1/1996 | Chao | G06F 3/0601 |
| | | | | | 711/112 |
| 9,135,016 | B1 | | 9/2015 | Oconnell | |
| 9,223,843 | B1 | | 12/2015 | Madhavarapu | |
| 2001/0013102 | A1 | | 8/2001 | Tsuchiya et al. | |
| 2005/0273650 | A1 | | 12/2005 | Tsou | |
| 2009/0024815 | A1 | * | 1/2009 | Iwamura | G06F 11/2064 |
| | | | | | 711/162 |
| 2016/0077925 | A1 | | 3/2016 | Tekade | |
| 2017/0060699 | A1 | | 3/2017 | Hohl | |
| 2017/0116220 | A1 | | 4/2017 | Wong | |
| 2020/0026615 | A1 | * | 1/2020 | Bagchi | G06F 16/278 |
| 2020/0026622 | A1 | | 1/2020 | Bagchi | |

OTHER PUBLICATIONS

McGehee, "SQL Server Backup and Restore", Apr. 2012 (Year: 2012).*
Pawankumawat, "Avamar: AVSQL Error <15762>: Skipping Incremental Backup After Full For (Local)/Databasename Database. Error: Unable To Get Log Gap Detection Data", Feb. 2015 (Year: 2015).*

* cited by examiner

*Primary Examiner* — Dawaune A Conyers
(74) *Attorney, Agent, or Firm* — Chamberlain, Hrdlicka, White, Williams & Aughtry

(57) ABSTRACT

An intelligent log gap detection to ensure necessary backup promotion. Specifically, a method and system are disclosed, which entail determining whether to pursue a differential database backup or promote the differential database backup to a full database backup, in order to preclude data loss across high availability databases. The deduction pivots on a matching or mismatching between log sequence numbers (LSNs).

15 Claims, 12 Drawing Sheets

US 10,977,137 B2

INTELLIGENT LOG GAP DETECTION TO ENSURE NECESSARY BACKUP PROMOTION

BACKGROUND

Often, multiple databases are configured to fail over together, to ensure high availability of the consolidated information. Also, at times, disaster recovery for these databases are managed not by a sole backup platform, but various backup platforms, which do not cross-share information. As it stands, being unaware of the others' actions, gaps in the backup chain for these databases are prevalent, leading to data loss upon restoration of the databases.

DETAILED DESCRIPTION

Specific embodiments of the invention will now be described in detail with reference to the accompanying figures. In the following detailed description of the embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-7B, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and a first element may encompass more than one element and succeed (or precede) the second element in an ordering of elements.

In general, embodiments of the invention relate to intelligent log gap detection to ensure necessary backup promotion. Specifically, one or more embodiments of the invention entails determining whether to pursue a differential database backup or promote the differential database backup to a full database backup, in order to preclude data loss across high availability databases. The deduction pivots on a matching or mismatching between log sequence numbers (LSNs).

Figure 1:
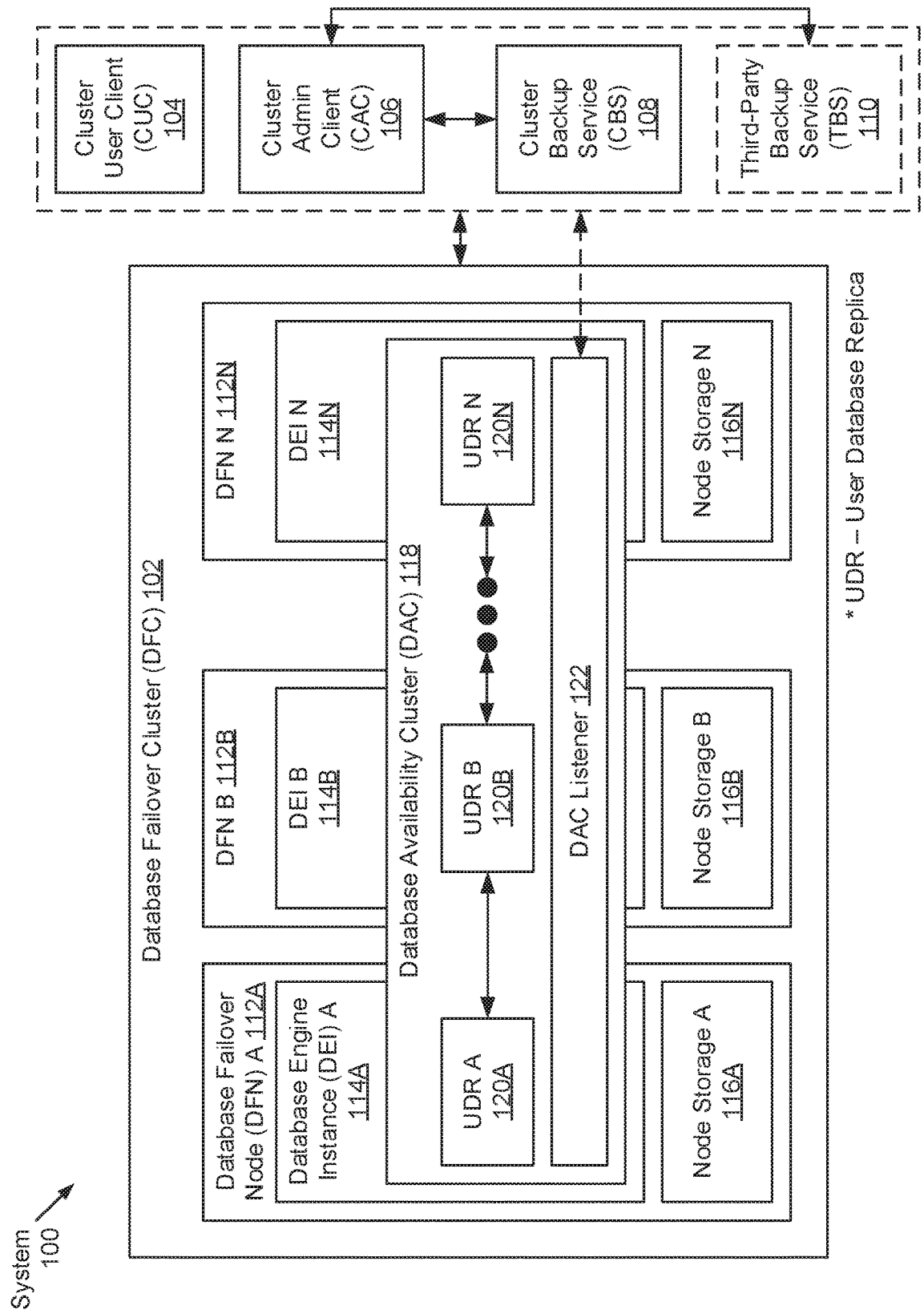
FIG. 1 shows a system in accordance with one or more embodiments of the invention.

FIG. 1 shows a system in accordance with one or more embodiments of the invention. The system (100) may include a database failover cluster (DFC) (102), one or more cluster user clients (CUC) (104), one or more cluster admin clients (CAC) (106), a cluster backup service (CBS) (108), and, optionally, one or more third-party backup services (TBS) (110). Each of these components is described below.

In one embodiment of the invention, the above-mentioned components may be directly or indirectly connected to one another through a network (not shown) (e.g., a local area network (LAN), a wide area network (WAN) such as the Internet, a mobile network, or any other network). The network may be implemented using any combination of wired and/or wireless connections. In embodiments in which the above-mentioned components are indirectly connected, there may be other networking components or systems (e.g., switches, routers, gateways, etc.) that facilitate communications, information exchange, and/or resource sharing between the various components. Further, the above-mentioned components may communicate with one another using any combination of wired and/or wireless communication protocols.

In one embodiment of the invention, the DFC (102) may refer to a group of linked nodes—i.e., database failover nodes (DFNs) (112A-112N) (described below)—that work together to maintain high availability (or minimize downtime) of one or more applications and/or services. The DFC (102) may achieve the maintenance of high availability by distributing any workload (i.e., applications and/or services) across or among the various DFNs (112A-112N) such that, in the event that any one or more DFNs (112A-112N) go offline, the workload may be subsumed by, and therefore may remain available on, other DFNs (112A-122N) of the DFC (102). Further, reasons for which a DFN (112A-112N) may go offline include, but are not limited to, scheduled maintenance, unexpected power outages, and failure events induced through, for example, hardware failure, data corruption, and other anomalies caused by cyber security attacks and/or threats. Moreover, the various DFNs (112A-112N) in the DFC (102) may reside in different physical (or geographical) locations in order to mitigate the effects of unexpected power outages and failure (or failover) events.

By way of an example, the DFC (102) may represent an AlwaysOn Failover Cluster or a Windows Server Failover Cluster (WSFC), which may each encompass multiple Structured Query Language (SQL) servers.

Figure 6:
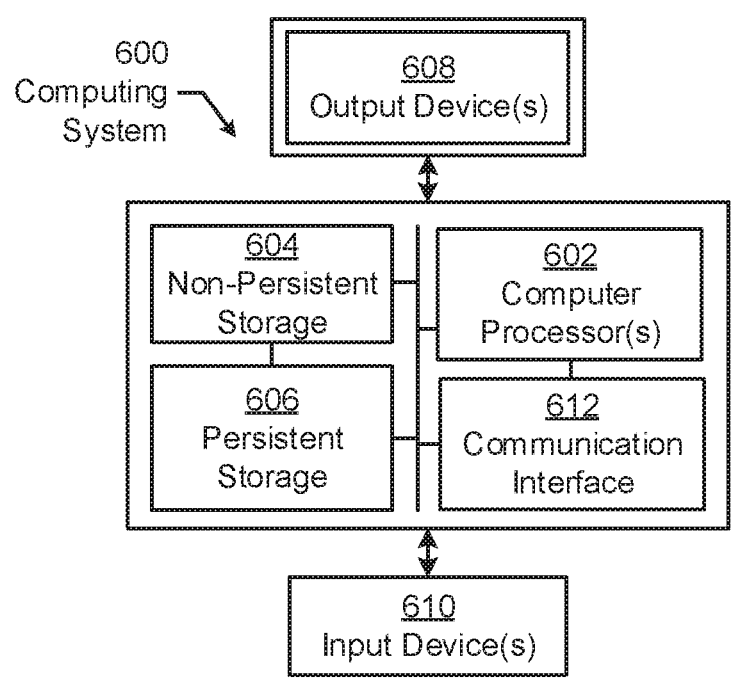
FIG. 6 shows a computing system in accordance with one or more embodiments of the invention.

In one embodiment of the invention, a DFN (112A-112N) may be a physical appliance—e.g., a server or any computing system similar to the exemplary computing system shown in FIG. 6. Further, each DFN (112A-112N) may include functionality to maintain an awareness of the status of every other DFN (112A-112N) in the DFC (102). By way of an example, this awareness may be implemented through the periodic issuance of heartbeat protocol messages between DFNs (112A-112N), which serve to indicate whether any particular DFN (112A-112N) may be operating normally or, for some reason, may be offline. In the occurrence of an offline event on one or more DFNs (112A-112N), as mentioned above, the remaining (operably normal) DFNs (112A-112N) may assume the responsibilities (e.g., provides the applications and/or services) of the offline DFNs (112A-112N) without, at least while minimizing, downtime experienced by the end users (i.e., operators of one or more CUCs (104)) of the DFC (102).

In one embodiment of the invention, the various DFNs (112A-112N) in the DFC (102) may operate under an active-standby (or active-passive) failover configuration. That is, under the aforementioned failover configuration, one of the DFNs (e.g., 112A) of the DFC (102) may play the role of the active (or primary) node in the DFC (102), whereas the remaining one or more DFNs (e.g., 112B-112N) may each play the role of a standby (or secondary) node in the DFC (102). With respect to roles, the active node may refer to a node to which client traffic (i.e., network traffic originating from one or more CUCs (104)) may currently be directed. The active node may also refer to the node whereon a current primary user database replica (UDR) (120A-120N) (described below) resides. On the other hand, a standby node may refer to a node that may not be currently interacting with one or more CUCs (104) and/or whereon a current secondary UDR (120A-120N) may reside.

In one embodiment of the invention, each DFN (112A-112N) may host a database engine instance (DEI) (114A-114N) thereon. A DEI (114A-114N) may refer to a computer program or process (i.e., an instance of a computer program) tasked with executing an operating system (OS) service. Specifically, a DEI (114A-114N) include functionality to manage one or more user databases (i.e., one or more UDRs (120A-120N)). Further, a DEI (114A-114N) may operate as a service that handles all input-output (IO) requests to interact with the data in any of the user databases managed by the DEI (114A-114N). The IO requests may represent at least a portion of client traffic submitted by one or more CUCs (104). By way of an example, a DEI (114A-114N) may correlate to a SQL Server Instance.

In one embodiment of the invention, each DFN (112A-112N) may include a node storage (116A-116N). A node storage (116A-116N) may represent one or more physical storage devices and/or media on which various forms of information, pertinent to a respective DFN (112A-112N), may be consolidated. The one or more physical storage devices and/or media may or may not be of the same type. Further, information consolidated in a node storage (116A-116N) may be arranged using any storage mechanism (e.g., a filesystem, a collection of tables or records, etc.). Moreover, a node storage (116A-116N) may host a respective UDR (120A-120N) (described below). In one embodiment of the invention, a node storage (116A-116N) may be implemented using persistent storage (i.e., non-volatile) storage devices and/or media. Examples of persistent storage include, but are not limited to: optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage device and/or media defined as non-volatile Storage Class Memory (SCM).

In one embodiment of the invention, each DFN (112A-112N) may further include a UDR (120A-120N), which may encompass a local copy of one or more user databases maintained across the DFC (102). Substantively, a UDR (120A-120N) may be a storage system or media for consolidating various forms of information pertinent to one or more end users (i.e., operators of the one or more CUCs (104)). Information consolidated in a UDR (120A-120N) may be partitioned into either a data files segment (not shown) or a log files segment (not shown). Information residing in the data files segment may include, for example, data and objects such as tables, indexes, stored procedures, and views. Further, any information written to a UDR (120A-120N), by one or more end users, may be retained in the data files segment.

On the other hand, in one embodiment of the invention, information residing in the log files segment may include, for example, a transaction log and any other metadata that may facilitate the recovery of any and all transactions in a UDR (120A-120N). A transaction log may refer to a data object or structure that records all transactions, and database changes made by each transaction, pertinent to the UDR (120A-120N) within which the transaction log resides. Further, each transaction or record in the transaction log may be identified through a unique log sequence number (LSN). A LSN may represent the offset, in bytes, of the transaction log record (that which the LSN identifies) from the beginning of a database log file. Furthermore, LSNs may be ordered in such a way that changes denoted by a transaction identified by a greater LSN occurred after the changes denoted by another transaction identified by a lesser LSN.

In one embodiment of the invention, the multiple UDRs (120A-120N) across the DFC (102) may collectively form a database availability cluster (DAC) (118). A DAC (118) may refer to a container for a set of databases that have been configured to failover together. That is, within a DAC (118), there may be one active (or primary) UDR (120A-120N) and one or more passive (or secondary) UDRs (120A-120N). Further, when online, the active UDR (120A-120N) may take ownership of information read therefrom and written thereto by one or more CUCs (104). However, when the active UDR (120A-120N) experiences failure, one of the one or more passive UDRs (120A-120N) may subsume the ownership of the information, thereby, becoming active. The active UDR (120A-120N), at any given time, thus operates in read-write (RW) mode, which grants the one or more CUCs (104) read and write access to the active UDR (120A-120N). On the other hand, the one or more passive UDRs (120A-120N), at any given time, operate in read-only (RO) mode, which grants the one or more CUCs (104) only read access to the one or more passive UDRs (120A-120N). By way of an example, the DAC (118) may represent an AlwaysOn Availability Group (AAG).

In one embodiment of the invention, the DAC (118) may further include a DAC listener (122). The DAC listener (122) may refer to a logical portal to which clients (e.g., CUCs (104) and/or CACs (106)) may connect in order to access the multiple UDRs (120A-120N) of the DAC (118). To this end, the DAC listener (122) may be associated with a unique domain name service (DNS) name that serves as a virtual network name (VNN), one or more virtual Internet Protocol (VIP) addresses, and a transmission control protocol (TCP) port number. Substantively, a client may use DNS to resolve the VNN into the one or more VIP addresses. Thereafter, the client may attempt to connect to each of the VIP addresses until a connection request succeeds (i.e., thereby granting the client access to a UDR (120A-120N)) or until the connection requests time out.

In one embodiment of the invention, a CUC (104) may be any computing system operated by a user of the DFC (106). A user of the DFC (106) may refer to an individual, a group of individuals, or an entity for which the database(s) of the DFC (106) is/are intended; or whom accesses the database(s). Further, a CUC (104) may include functionality to: submit application programming interface (API) requests to the DFC (106), where the API requests may be directed to accessing (e.g., reading data from and/or writing data to) the database(s) of the DFC (106); and receive API responses, from the DFC (106), entailing, for example, queried information. One of ordinary skill will appreciate that a CUC (104) may perform other functionalities without departing from the scope of the invention. Examples of a CUC (104) include, but are not limited to, a desktop computer, a laptop computer, a tablet computer, a server, a mainframe, a smartphone, or any other computing system similar to the exemplary computing system shown in FIG. 6.

In one embodiment of the invention, a CAC (106) may be any computing system operated by an administrator of the DFC (106). An administrator of the DFC (106) may refer to an individual, a group of individuals, or an entity whom may be responsible for overseeing operations and maintenance pertinent to hardware, software, and/or firmware elements of the DFC (106). Further, a CAC (106) may include functionality to: submit database backup requests (described below) to the CBS (108), where the database backup requests may pertain to the performance of data backup operations on/of the active (or primary) UDR (120A-120N). One of ordinary skill will appreciate that a CAC (106) may perform other functionalities without departing from the scope of the invention. Examples of a CAC (106) include, but are not limited to, a desktop computer, a laptop computer, a tablet computer, a server, a mainframe, a smartphone, or any other computing system similar to the exemplary computing system shown in FIG. 6.

In one embodiment of the invention, the above-mentioned data backup operations may entail creating full database backups, differential database backups, and/or transaction log backups of at least the active/primary UDR (120A-120N) of the DAC (118). A full database backup may refer to the generation of a backup copy containing all data files and the transaction log (described above) residing on at least the active/primary UDR (120A-120N). A differential database backup may refer to the generation of a backup copy containing all changes made to at least the active/primary UDR (120A-120N) since the last full database backup, and changes to the transaction log, residing on at least the active/primary UDR (120A-120N). Meanwhile, a transaction log backup may refer to the generation of a backup copy containing all transaction log records that have been made between the last transaction log backup (or the first full database backup) and the last transaction log record that may be created upon completion of the data backup process.

In one embodiment of the invention, the CBS (108) may represent a platform for database backup and recovery that may service one or more DFNs (112A-112N) of the DFC (102). The CBS (108) may be implemented using one or more servers (not shown). Each server may be a physical server (i.e., in a datacenter) or a virtual server (i.e., residing in a cloud computing environment). In one embodiment of the invention, the CBS (108) may be implemented using one or more computing systems similar to the exemplary computing system shown in FIG. 6. Furthermore, the CBS (108) may include functionality to: maintain a cluster backup chain table (BCT) in accordance with embodiments of the invention (see e.g., FIGS. 2B and 4B); instruct cluster backup agents (CBAs) (not shown, described below) responsible for executing database backup and recovery operations on serviced DFNs (112A-112N); consolidate backup copies of the UDR (120A-120N) respective to serviced DFNs (112A-112N); and intelligently detect log gaps to ensure backup promotion in accordance with embodiments of the invention (see e.g., FIGS. 5A and 5B). The CBS (108) is described in further detail below with respect to FIG. 2A.

In one embodiment of the invention, a TBS (110) may refer to a third-party platform for database backup and recovery that may service zero or more DFNs (112A-112N) of the DFC (102). A TBS (110) may be implemented using one or more servers (not shown). Each server may be a physical server (i.e., in a datacenter) or a virtual server (i.e., residing in a cloud computing environment). In one embodiment of the invention, a TBS (110) may be implemented using one or more computing systems similar to the exemplary computing system shown in FIG. 6. Furthermore, a TBS (110) may include functionality to: instruct third-party backup agents (TBAs) (not shown, described below) responsible for executing database backup and recovery operations on serviced DFNs (112A-112N); and consolidate backup copies of the UDR (120A-120N) respective to serviced DFNs (112A-112N).

While FIG. 1 shows a configuration of components, other system configurations may be used without departing from the scope of the invention. For example, the DFC (102) (i.e., the various DFNs (112A-112N)) may host multiple DACs (118) (i.e., multiple sets of UDRs (120A-120N)).

Figure 2A:
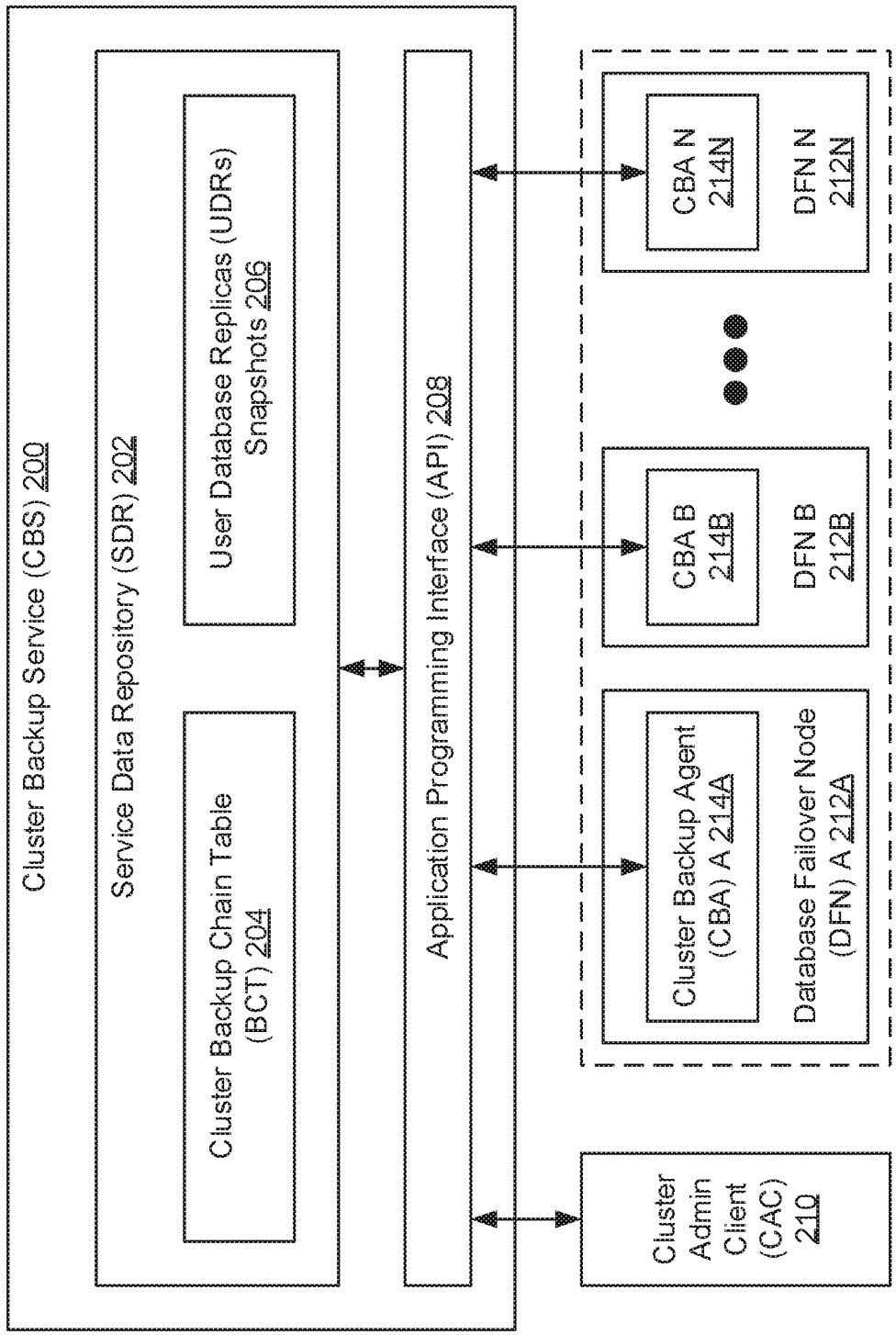
FIG. 2A shows a cluster backup service in accordance with one or more embodiments of the invention.

FIG. 2A shows a cluster backup service (CBS) in accordance with one or more embodiments of the invention. As described above, the CBS (200) may represent a platform for database backup and recovery that may service one or more database failover nodes (DFNs) of a database failover cluster (DFC) (see e.g., FIG. 1). The CBS (200) may include a service data repository (SDR) (202) operatively connected to an application programming interface (API) (208). Each of these components is described below.

In one embodiment of the invention, the SDR (202) may be a storage system or media for consolidating at least a cluster backup chain table (BCT) (204) and snapshots (i.e., backup copies) pertaining to one or more user database replicas (UDRs) (206). One of ordinary skill will appreciate that the SDR (202) may consolidate other information without departing from the scope of the invention. Further, the SDR (202) may be implemented across one or more physical and/or virtual storage units or devices, which may or may not be of the same type or co-located in a same computing system. In one embodiment of the invention, the SDR (202) may be implemented using persistent (i.e., non-volatile) storage media. Examples of persistent storage media include, but are not limited to: optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage media defined as non-volatile Storage Class Memory (SCM).

In one embodiment of the invention, the cluster BCT (204) may represent a data object or structure for storing database backup chains pertinent to all databases (i.e., UDRs) across a database availability cluster (DAC) (see e.g., FIG. 1). A database backup chain, for a given database, may refer to a sequence of database backups that records the appropriate order in which initial information and changes to the given database were consolidated. Restoration of a given database without experiencing data loss must therefore follow the sequence conveyed through the database backup chain. Further, each database backup recorded in a database backup chain may represent a full database backup, a differential database backup, or a transaction log backup of the given database associated with the database backup chain. The first database backup recorded in each database backup chain may always be a full database backup. The cluster BCT (204) is described in further detail below with respect to FIG. 2B.

In one embodiment of the invention, a UDR snapshot (206) may refer to a backup copy of a UDR (i.e., a database). The backup copy may entail a full database backup, a differential database backup, or a transaction log backup. A full database backup may replicate all data files and the transaction log (described above) of the database. A differential database backup may replicate all changes made to the database since the last full database backup, as well as changes since then made to the transaction log of the database. Meanwhile, a transaction log backup may replicate all transaction log records that have been made between the last transaction log backup (or the first full database backup) and the last transaction log record that may be created upon completion of the database backup process. Moreover, the SDR (202) may only consolidate UDR snapshots (206) pertaining to the one or more UDRs residing on the one or more DFNs (212A-212N), respectively, that which the CBS (200) services.

In one embodiment of the invention, the API (208) may be a hardware and/or software implemented construct that employs a set of subroutine definitions, protocols, and/or tools for enabling communications and/or information exchange between the CBS (200) and various external entities. These external entities may include, but are not limited to, one or more cluster admin clients (CAC) (210) (see e.g., FIG. 1) and one or more DFNs (212A-212N) that which the CBS (200) may service. Further, the API (208) may include functionality to: receive API requests from these external entities; and transmit API responses, based on processing of the aforementioned API requests, to the appropriate external entities. More specifically, the API (208) may provide a portal through which, for example, the CBS (200) may be configured by a CAC (210), the cluster BCT (204) may be populated by information provided by one or more DFNs (212A-212N), UDR snapshots (206) may be provided for consolidation, and instructions may be submitted from the CBS (200) to the one or more DFNs (212A-212N) (i.e., specifically, the cluster backup agent (CBA) (214A-214N) (described below) executing on each DFN (212A-212N)). One of ordinary skill will appreciate that the API (208) may perform other functionalities without departing from the scope of the invention. By way of an example, the API (208) may be a web API that may be accessed through an assigned web address (e.g., a uniform resource locator (URL)) and a wide area network (WAN) (e.g., Internet) connection.

Figure 2B:
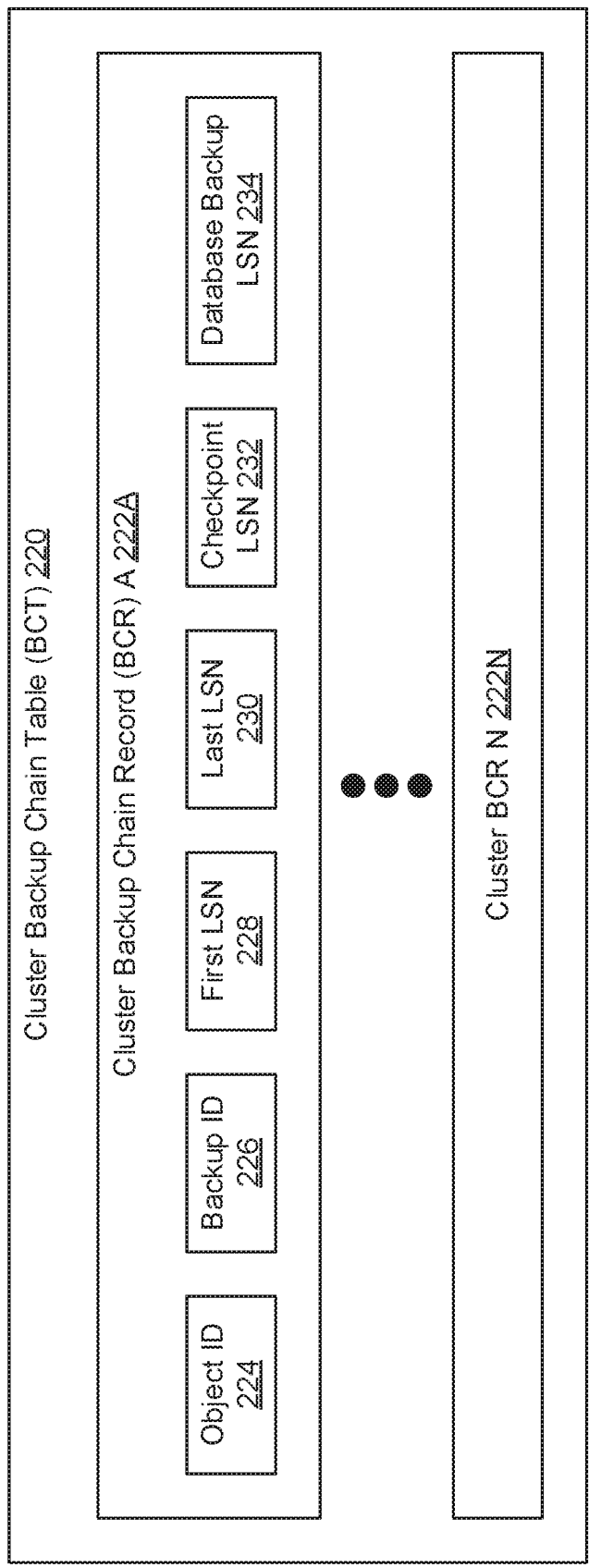
FIG. 2B shows a cluster backup chain table in accordance with one or more embodiments of the invention.

FIG. 2B shows a cluster backup chain table (BCT) in accordance with one or more embodiments of the invention. As described above, the cluster BCT (220) may represent a data object or structure for storing database backup chains pertinent to all databases (i.e., UDRs) across a DAC (see e.g., FIG. 1). Further, the cluster BCT (220) may be maintained, by a kernel of the cluster backup service (CBS) (on which the cluster BCT (220) resides) using changes to one or more database backup chains shared by one or more database failover nodes (DFNs), respectively. In one embodiment of the invention, the cluster BCT (220) may sequence database backups performed across the DAC as one or more cluster backup chain records (BCRs) (222A-222N). Each cluster BCR (222A-222N) may be a data container within which various related items of information reside. These related items of information may include, but are not limited to, an object identifier (ID) (224), a backup ID (226), a first log sequence number (LSN) (228), a last LSN (230), a checkpoint LSN (232), and a database backup LSN (234). Each of these items of information is described below.

In one embodiment of the invention, the object ID (224) may refer to a string of characters (e.g., letters, numbers, symbols, etc.) that may uniquely identify a user database replica (UDR). That is, with each cluster BCR (222A-222N) being directed to a performed and catalogued database backup, the object ID (224) specified therein may identify the UDR of the DAC to which the database backup pertains. Furthermore, the object ID (224) may extend any length and may entail any combination of characters. By way of an example, the object ID (224) may be represented through an alphanumeric tag assigned by a database failover cluster (DFC) (see e.g., FIG. 1) administrator, or a N-bit integer (where N>0) expressed in hexadecimal notation, which may be generated by a logical intelligence (i.e., software) executing on the DFC.

In one embodiment of the invention, the backup ID (226) may refer to a string of characters (e.g., letters, numbers, symbols, etc.) that may uniquely identify a database backup. A database backup, as mentioned above, may entail a full database backup, a differential database backup, or a transaction log backup, which pertains to the UDR of the DAC identified by the object ID (224). Furthermore, the backup ID (226) may extend any length and may entail any combination of characters. By way of an example, the backup ID (226) may be represented through an alphanumeric tag assigned by a DFC administrator, or a N-bit integer (where N>0) expressed in hexadecimal notation, which may be generated by a logical intelligence (i.e., software) executing on the DFC.

In one embodiment of the invention, the first LSN (228) may refer to the LSN of a first transaction captured in the database backup to which the cluster BCR (222A-222N) is directed. As described above, each transaction recorded in the transaction log of a database (i.e., a UDR) may be identified through a unique LSN, where the LSN may represent the offset, in bytes, of the transaction log record (with which the LSN identifies) from the beginning of a database log file. Meanwhile, in one embodiment of the invention, the last LSN (230) may refer to the LSN of a next transaction catalogued (or to be catalogued) after the database backup to which the cluster BCR (222A-222N) is directed. That is, transactions captured in the database backup may be identified by a set of LSNs that begin with the specified first LSN (228) up to, yet excluding, the specified last LSN (230). Moreover, as mentioned above, LSNs are sequential in nature—meaning that a transaction identified through a higher LSN value implies that the transaction occurred at a later point in time. Naturally, the first LSN (228) specified in any cluster BCR (222A-222N)

should indicate a lesser value than the last LSN (230) specified in the same cluster BCR (222A-222N).

In one embodiment of the invention, the checkpoint LSN (232) may refer to the LSN of a latest checkpoint captured in the database backup to which the cluster BCR (222A-222N) is directed. A checkpoint may refer to a process, which when triggered, writes any current in-memory dirty data file pages (i.e., pages modified since the previous checkpoint) and transaction log records from a buffer cache to a physical disk. Various types of checkpoints may be supported, including, but not limited to, automatic checkpoints, indirect checkpoints, manual checkpoints, and internal checkpoints, which may be issued as background processes or triggered by DFC administrators, end users, and/or system events. Lastly, in one embodiment of the invention, the database backup LSN (234) may refer to the LSN of the first transaction captured in the latest (or most recently) performed full database backup. Accordingly, the database backup LSN (234) may serve to relate one or more differential database and/or transaction log backups to a full database backup from which the former backups may depend. That is, in cases where a differential database or transaction log backup belong to a particular full database backup, the database backup LSN (234) of the differential database or transaction log backup should match the first LSN (228) and/or the checkpoint LSN (232) of the full database backup. For full database backups, the associated first LSN (228) should match the associated checkpoint LSN (232).

Figure 3A:
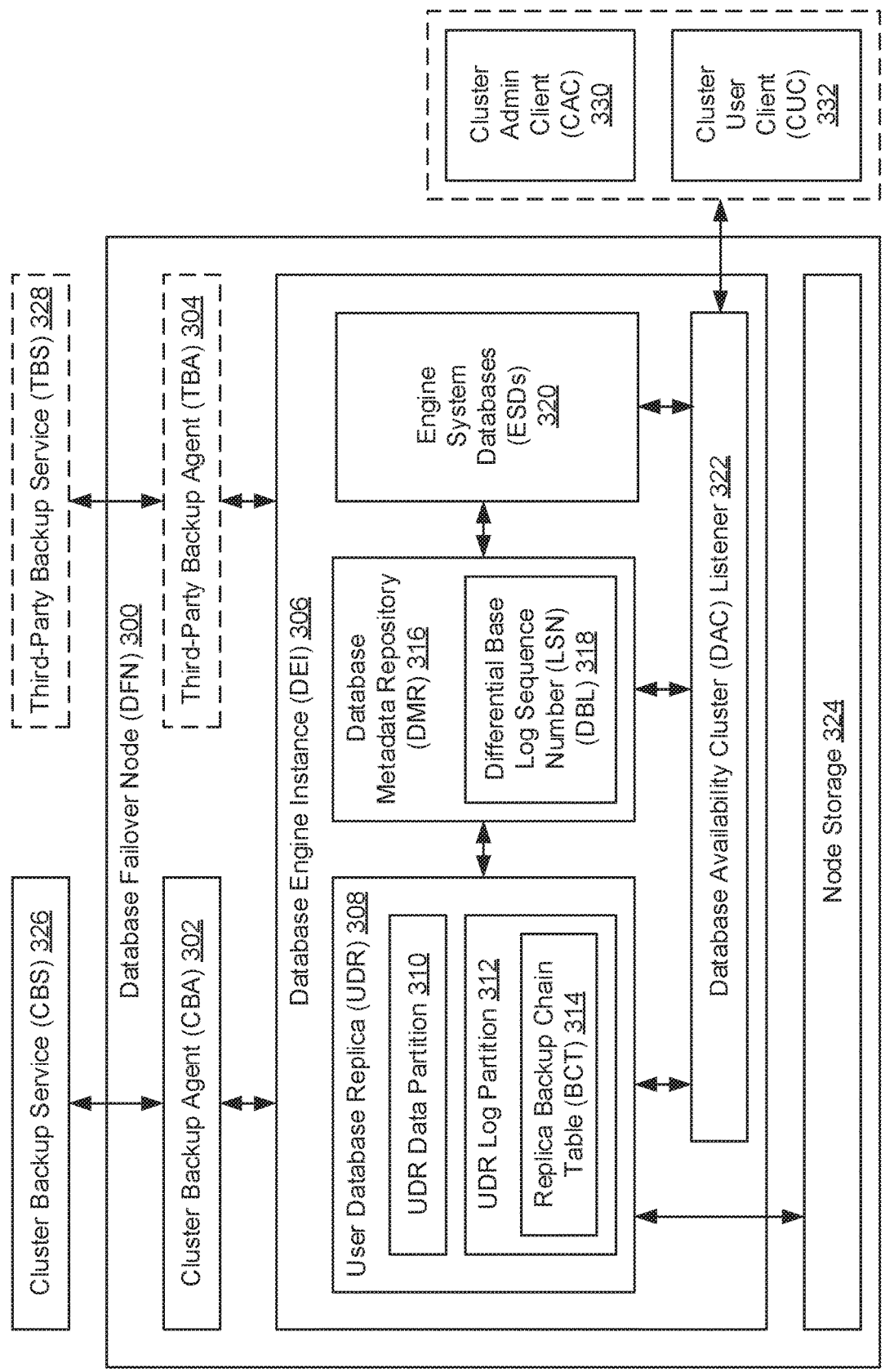
FIG. 3A shows a database failover node in accordance with one or more embodiments of the invention.

FIG. 3A shows a database failover node (DFN) in accordance with one or more embodiments of the invention. Each DFN (300) may be a physical appliance—e.g., a server or any computing system similar to the exemplary computing system shown in FIG. 6—that links with other DFNs (not shown) to form a database failover cluster (DFC) (see e.g., FIG. 1). Further, each DFN (300) may include a cluster backup agent (CBA) (302) or a third-party backup agent (TBA) (304), a database engine instance (DEI) (306), and node storage (324). Each of these components is described below.

In one embodiment of the invention, the cluster backup service (CBS) (326) may service a subset or all DFNs (300) in the DFC. Accordingly, every DFN (300) serviced by the CBS (326) may host a corresponding CBA (302). The CBA (302) may be a computer program or process (i.e., an instance of a computer program) that executes on the underlying hardware of the DFN (300). Specifically, the CBA (302) may be a client computer program or process that works hand-in-hand with the CBS (326). Further, the CBA (302) may include functionality to: receive queries from the CBS (326); in response to the aforementioned queries, communicate database metadata back to the CBS (326); monitor and detect updates to the replica backup chain table (BCT) (314) (described below), which is pertinent to the tracking of database backups performed of the UDR (308); communicate these aforementioned updates to the CBS (326); receive commands from the CBS (326); and process these aforementioned commands to execute full database backups, differential database backups, and/or transaction log backups (described above) of the UDR (308). The CBA (302) may also create database backups based on preset configurations or schedules programmed by a CBS (326) administrator.

In embodiments where the CBS (326) services a subset of the DFNs (300) in the DFC, the remaining DFNs (300) may be serviced by one or more third-party backup services (TBSs) (328). Accordingly, every DFN (300) that may be serviced by a TBS (328) may host a corresponding TBA (304). The TBA (304) may be a computer program or process (i.e., an instance of a computer program) that executes on the underlying hardware of the DFN (300). Specifically, the TBA (304) may be a client computer program or process that works hand-in-hand with a TBS (328). Further, the TBA (304) may include functionality to: create full database backups, differential database backups, and/or transaction log backups (described above) of the UDR (308) based on requests received from a TBS (328). Moreover, one of ordinary skill will appreciate that the TBA (304) may perform other functionalities without departing from the scope of the invention.

In one embodiment of the invention, the DEI (306) may be a computer program or process (i.e., an instance of a computer program) that executes on the underlying hardware of the DFN (300). Specifically, the DEI (306) may be a computer program or process tasked with executing an operating system (OS) service that manages one or more local copies of databases (e.g., the UDR (308), the database metadata repository (DMR) (316), one or more engine system databases (ESDs) (320), etc.) that reside on the DFN (300). Further, the DEI (306) may operate as a service that, at least in part, handles any and all input-output (IO) requests to interact with data and/or metadata in any of the local database copies managed by the DEI (306). By way of an example, the DEI (306) may represent a structured query language (SQL) Server Instance.

In one embodiment of the invention, the DEI (306) may include functionality to mount the UDR (308), which may be hosted on one or more physical devices and/or media that implement at least a portion of the node storage (324). As described above, the UDR (308) may represent a local copy of one or more user databases that may be maintained across the DFC. Substantively, the UDR (308) may be a storage system or media for consolidating various forms of information. The information consolidated in the UDR (308) may be partitioned into a UDR data partition (310) (i.e., disclosed above as a data files segment) or a UDR log partition (312) (i.e., disclosed above as a log files segment). Information residing in the UDR data partition (310) may include, for example, data and objects such as tables, indexes, stored procedures, and views. Further, any information written to the UDR (308), by one or more end users of the DFC, may be retained in the UDR data partition (310). On the other hand, in one embodiment of the invention, information residing in the UDR log partition (312) may include, for example, the transaction log for the UDR (308) (not shown) and a replica BCT (314). The transaction log, again, may refer to a data object or structure that records all transactions, and database changes made by each transaction, pertinent to the UDR (308). Meanwhile, the replica BCT (314) may be another data object or structure that stores the database backup chain for the UDR (308), which is described in further detail below with respect to FIG. 3B.

In one embodiment of the invention, the DEI (306) may include further functionality to mount a database metadata repository (DMR) (316), which may be hosted on one or more physical devices and/or media that implement at least a portion of the node storage (324). The DMR (316) may refer to storage dedicated to consolidating metadata pertaining to one or more user databases (i.e., the UDR (308)) and/or one or more system databases (i.e., the ESDs (320)). The consolidated metadata may refer to information that describes the user and/or system databases (e.g., database ID, database permissions, etc.) and the content or objects stored therein (e.g., object name, object properties, object definitions, etc.). Objects in the databases include, but are not limited to, tables, views, schemas, primary keys, check constraints, stored procedures, data types, etc. In one embodiment of the invention, the DMR (316) may store and track a differential base LSN (DBL) (318). The DBL (318) may refer to a metadata variable that stores the LSN of the latest checkpoint (described above) captured in the latest full database backup performed across all UDRs in the database availability cluster (see e.g., FIG. 1).

In one embodiment of the invention, the DEI (306) may include further functionality to mount one or more ESDs (320), which may be hosted on one or more physical devices and/or media that implement at least a portion of the node storage (324). An ESD (320) may refer to a system database that may be fundamental to the operation, maintenance, and/or management of the DEI (306). Examples of ESDs (320) include, but are not limited to: a master system database, which may maintain any system level information for the DEI (306)—e.g., logins, linked servers, endpoints, and other system-wide configuration settings; a model system database, which may maintain templates used in the creation of new user databases; an agent system database, which may maintain configuration and execution history information pertaining to DEI (306) agent jobs, and any information pertaining to all backups and restores; a resources system database, which may maintain system level objects; and a temp system database, which may maintain a workspace for storing temporary objects or intermediate result sets.

In one embodiment of the invention, the DEI (306) may include further functionality to host an instance of the DAC listener (322). As described above, the DAC listener (322) may refer to a logical portal to which clients (e.g., one or more cluster user clients (CUC) (332) and/or one or more cluster admin clients (CAC) (330)) may connect in order to access the various databases and/or repositories (e.g., the UDR (308), the DMR (316), and the ESDs (320)) managed by the DEI (306). To this end, the DAC listener (322) may be associated with a unique domain name service (DNS) name that serves as a virtual network name (VNN), one or more virtual Internet Protocol (VIP) addresses, and a transmission control protocol (TCP) port number. Substantively, a client may use DNS to resolve the VNN into the one or more VIP addresses. Thereafter, the client may attempt to connect to each of the VIP addresses until a connection request succeeds (i.e., thereby granting the client access to one or more of the various databases/repositories) or until the connection requests time out.

Figure 3B:
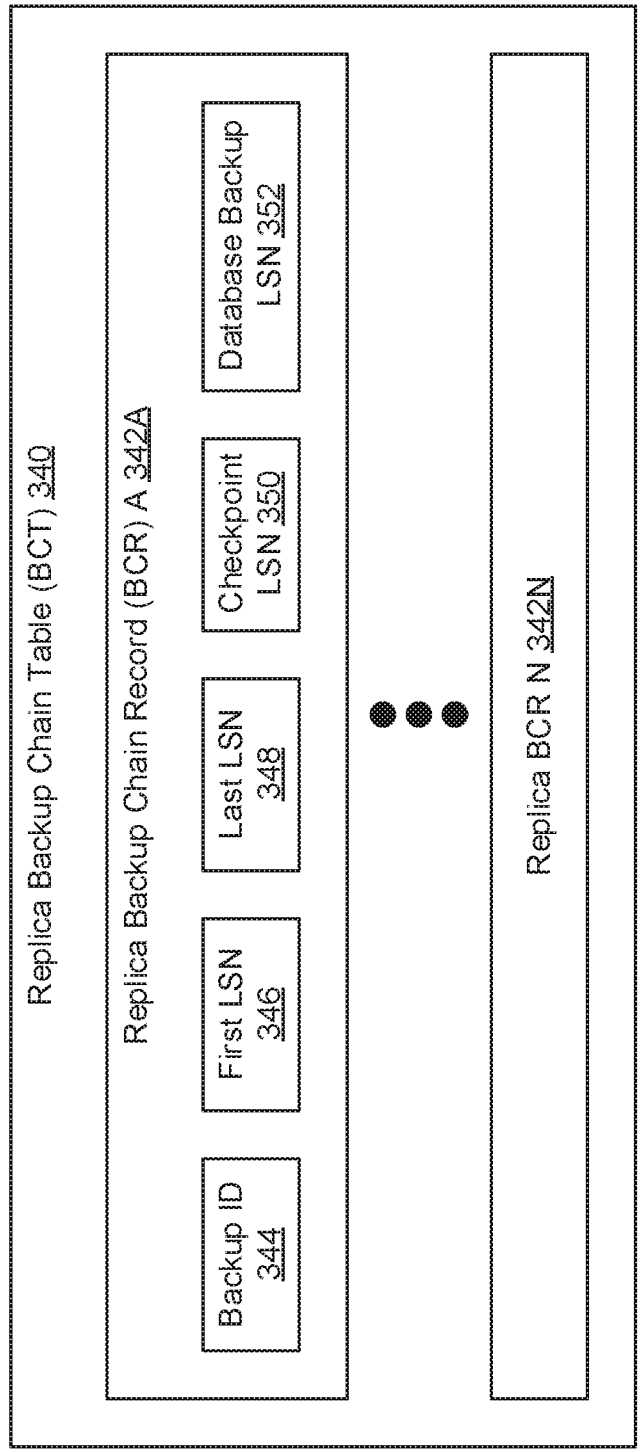
FIG. 3B shows a replica backup chain table in accordance with one or more embodiments of the invention.

FIG. 3B shows a replica backup chain table (BCT) in accordance with one or more embodiments of the invention. The replica BCT (340) may represent a data object or structure for storing the database backup chain pertinent to a given user database replica (UDR) (not shown). As described above, the replica BCT (340) may be stored within a log partition of the UDR. Further, the replica BCT (340) may be maintained, by the UDR itself, thus tracking the proper sequence of full database, differential database, and transaction log backups that may have been performed thereon. Subsequently, in one embodiment of the invention, the replica BCT (340) may sequence database backups performed on a given UDR as one or more replica backup chain records (BCRs) (342A-342N). Each replica BCR (242A-242N) may represent a data container within which various related items of information reside. These related items of information may include, but are not limited to, a backup identifier (ID) (344), a first log sequence number (LSN) (346), a last LSN (348), a checkpoint LSN (350), and a database backup LSN (352). Each of these items of information is described below.

In one embodiment of the invention, the backup ID (344) may refer to a string of characters (e.g., letters, numbers, symbols, etc.) that may uniquely identify a database backup. A database backup may entail a full database backup, a differential database backup, or a transaction log backup. Furthermore, the backup ID (344) may extend any length and may entail any combination of characters. By way of an example, the backup ID (344) may be represented through an alphanumeric tag or a N-bit integer (where N>0) expressed in hexadecimal notation.

In one embodiment of the invention, the first LSN (346) may refer to the LSN of a first transaction captured in the database backup identified by the backup ID (344). As described above, each transaction recorded in the transaction log of a database (i.e., a UDR) may be identified through a unique LSN, where the LSN may represent the offset, in bytes, of the transaction log record (with which the LSN identifies) from the beginning of a database log file. Meanwhile, in one embodiment of the invention, the last LSN (348) may refer to the LSN of a next transaction catalogued (or to be catalogued) after the database backup identified by the backup ID (344). That is, transactions captured in the database backup may be identified by a set of LSNs that begin with the specified first LSN (346) up to, yet excluding, the specified last LSN (348). Moreover, as mentioned above, LSNs are sequential in nature—meaning that a transaction identified through a higher LSN value implies that the transaction occurred at a later point in time. Naturally, the first LSN (346) specified in any replica BCR (342A-342N) should indicate a lesser value than the last LSN (348) specified in the same replica BCR (342A-342N).

In one embodiment of the invention, the checkpoint LSN (350) may refer to the LSN of a latest checkpoint captured in the database backup identified by the backup ID (344). A checkpoint may refer to a process, which when triggered, writes any current in-memory dirty data file pages (i.e., pages modified since the previous checkpoint) and transaction log records from a buffer cache to a physical disk. Various types of checkpoints may be supported, including, but not limited to, automatic checkpoints, indirect checkpoints, manual checkpoints, and internal checkpoints, which may be issued as background processes or triggered by database failover cluster (DFC) administrators, end users, and/or system events. Lastly, in one embodiment of the invention, the database backup LSN (352) may refer to the LSN of the first transaction captured in the latest (or most recently) performed full database backup. Accordingly, the database backup LSN (234) may serve to relate one or more differential database and/or transaction log backups to a full database backup from which the former backups may depend. That is, in cases where a differential database or transaction log backup belong to a particular full database backup, the database backup LSN (234) of the differential database or transaction log backup should match the first LSN (228) and/or the checkpoint LSN (232) of the full database backup. For full database backups, the associated first LSN (228) should match the associated checkpoint LSN (232).

Figure 4A:
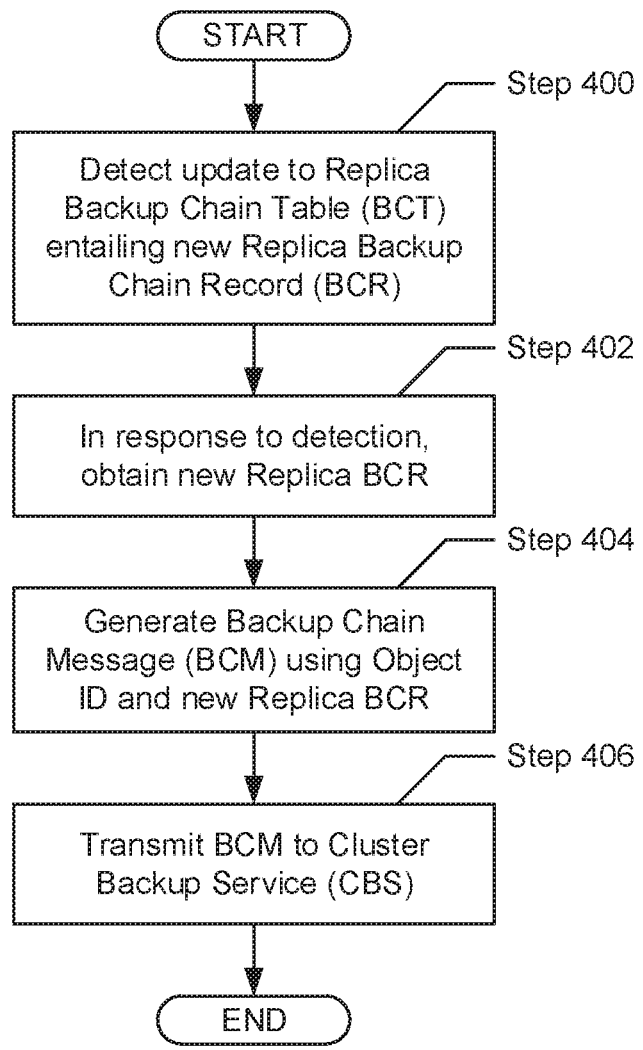
FIG. 4A shows a flowchart describing a method for sharing database backup chain updates in accordance with one or more embodiments of the invention.

FIG. 4A shows a flowchart describing a method for sharing database backup chain updates in accordance with one or more embodiments of the invention. The various steps outlined below may be performed by the cluster backup agent (CBA) residing on an active (or primary) database failover node (DFN) (see e.g., FIG. 3A). Further, while the various steps in the flowchart are presented and described sequentially, one of ordinary skill will appreciate that some or all steps may be executed in different orders, may be combined or omitted, and some or all steps may be executed in parallel.

Turning to FIG. 4A, in Step 400, an update to a replica backup chain table (BCT) (see e.g., FIG. 3B) is detected. In one embodiment of the invention, the update may entail the appendage of a new replica backup chain record (BCR) to the replica BCT. Further, the new replica BCR may store information pertinent to a latest (or most recently) performed full database backup, differential database backup, or transaction log backup of the active (or primary) user database replica (UDR) in the database availability cluster (DAC).

In Step 402, in response to detecting the above-mentioned update (in Step 400), the content of the new replica BCR is obtained from the replica BCT. Thereafter, in Step 404, a backup chain message (BCM) is generated using at least the new replica BCR content (obtained in Step 402). In one embodiment of the invention, the BCM may represent a container and transport for replica backup chain information. Generation of the BCM may further entail including an object identifier (ID) (see e.g., FIG. 2B). The object ID may refer to a string of characters (e.g., letters, numbers, symbols, etc.) that may uniquely identify the active/primary UDR in the DAC. In Step 406, after generating the BCM (in Step 404), the BCM is transmitted to the cluster backup service (CBS).

Figure 4B:
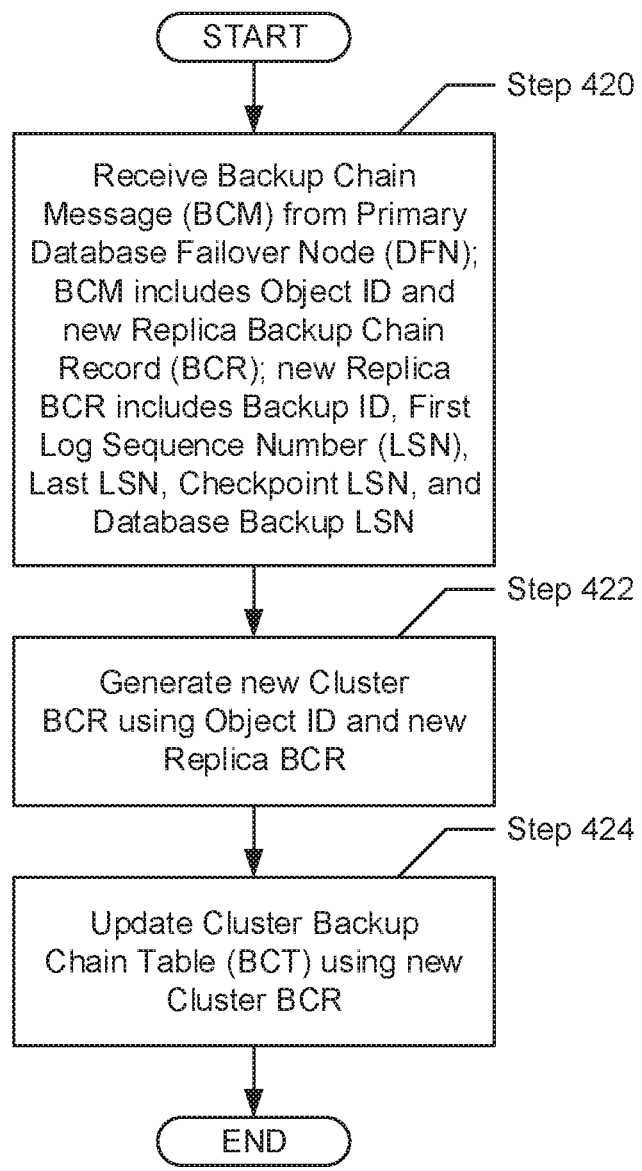
FIG. 4B shows a flowchart describing a method for maintaining cluster-wide database backup chains in accordance with one or more embodiments of the invention.

FIG. 4B shows a flowchart describing a method for maintaining cluster-wide database backup chains in accordance with one or more embodiments of the invention. The various steps outlined below may be performed by the cluster backup service (CBS). Further, while the various steps in the flowchart are presented and described sequentially, one of ordinary skill will appreciate that some or all steps may be executed in different orders, may be combined or omitted, and some or all steps may be executed in parallel.

Turning to FIG. 4B, in Step 420, a backup chain message (BCM) is received. In one embodiment of the invention, the BCM may have been generated and transmitted by a cluster backup agent (CBA) residing on the active (or primary) database failover node (DFN) of the database failover cluster (DFC). Further, the BCM may refer to a container and transport for replica backup chain information. Accordingly, the BCM may include an object ID identifying the active (or primary) user database replica (UDR) at present, and content specified in a new replica backup chain record (BCR) that had been recently appended to a replica backup chain table (BCT) associated with the active/primary UDR. Moreover, content specified in the new replica BCR may include, but is not limited to, a backup ID, a first log sequence number (LSN), a last LSN, a checkpoint LSN, and a database backup LSN. Each of these items of information is described in further detail above with respect to FIG. 3B.

In Step 422, a new cluster BCR is generated. Specifically, in one embodiment of the invention, the new cluster BCR may be generated using replica backup chain information received by way of the BCM (in Step 420). The new cluster BCR may represent a data container that specifies at least the following information: the object ID identifying the active (or primary) UDR at present; the backup ID identifying a latest (or most recently) performed full database backup, differential database backup, or transaction log backup of the active/primary UDR; and a first LSN, a last LSN, a checkpoint LSN, and a database backup LSN—all associated with the aforementioned latest (or most recently) performed database backup. Hereinafter, in Step 424, the cluster backup chain table (BCT) (see e.g., FIG. 2B) is updated using the new cluster BCR (generated in Step 422). More specifically, in one embodiment of the invention, the new cluster BCR may be appended to the cluster BCT, which may reside on the cluster backup service (CBS).

Figure 5A:
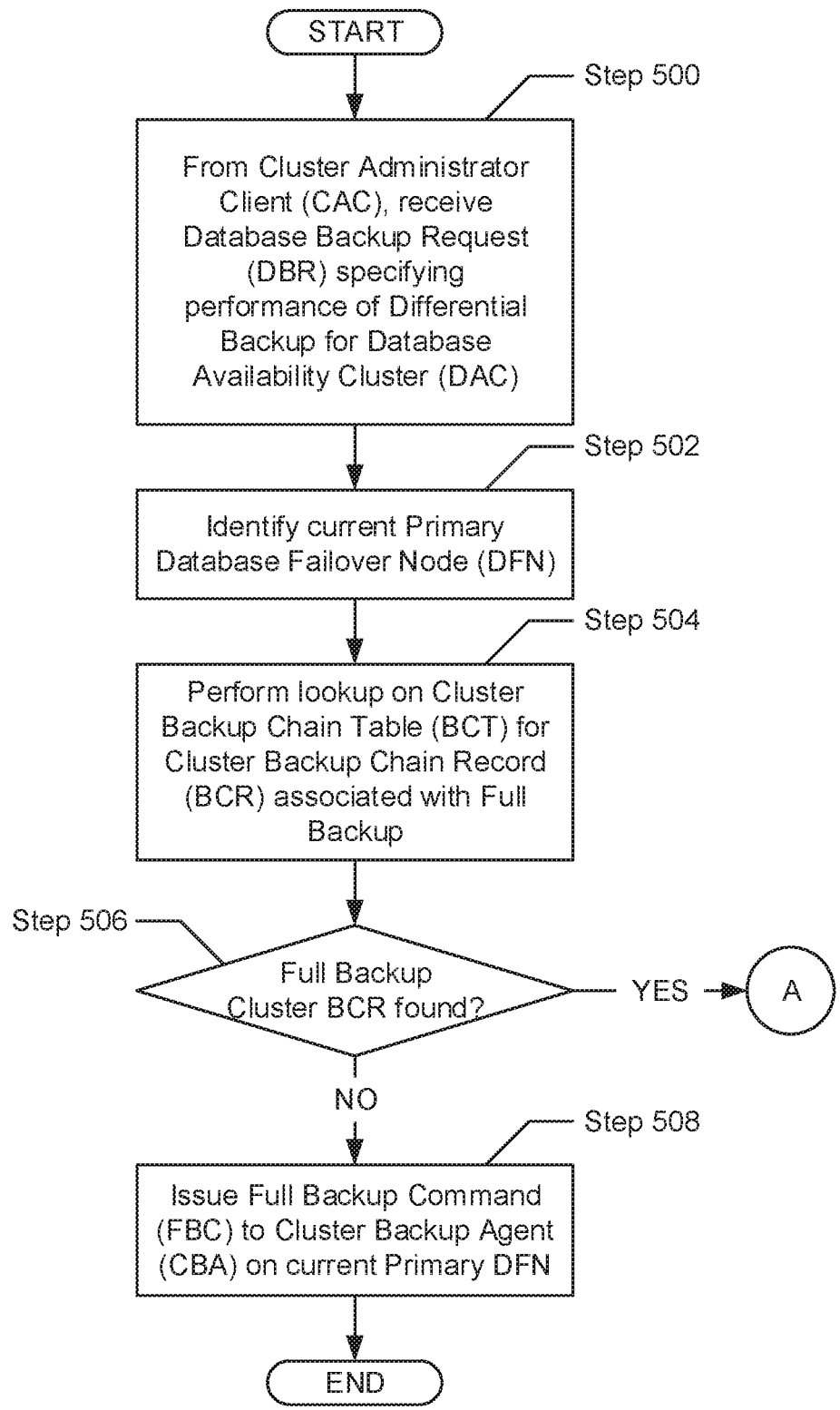
FIGS. 5A and 5B show flowcharts describing a method for intelligent log gap detection to ensure necessary backup promotion in accordance with one or more embodiments of the invention.
Figure 5B:
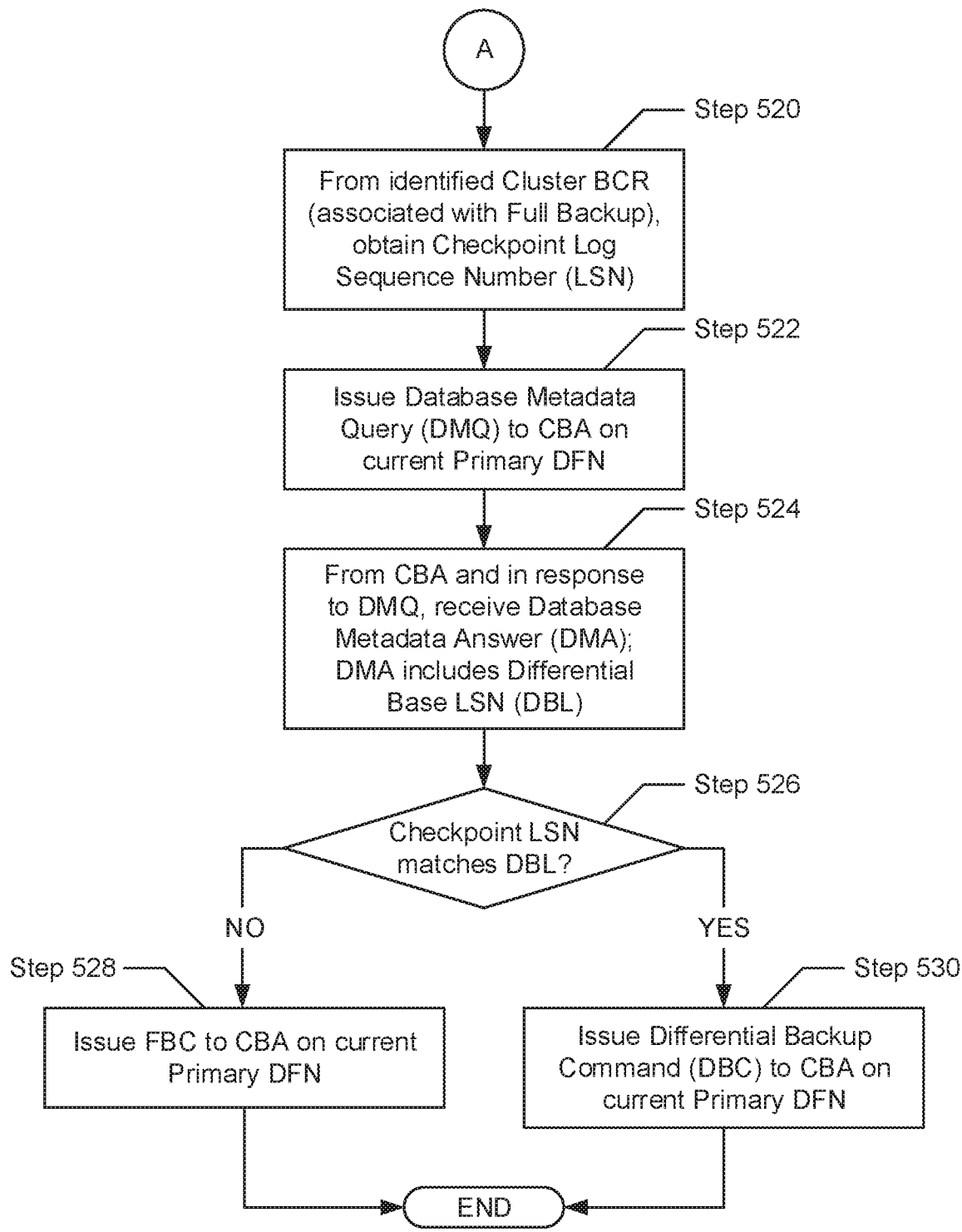

FIGS. 5A and 5B show flowcharts describing a method for intelligent log gap detection to ensure necessary backup promotion in accordance with one or more embodiments of the invention. The various steps outlined below may be performed by the cluster backup service (CBS). Further, while the various steps in the flowcharts are presented and described sequentially, one of ordinary skill will appreciate that some or all steps may be executed in different orders, may be combined or omitted, and some or all steps may be executed in parallel.

Turning to FIG. 5A, in Step 500, a database backup request (DBR) is received from a cluster admin client (CAC) (see e.g., FIG. 1). In one embodiment of the invention, the DBR may pertain to performing a differential database backup for a database availability cluster (DAC). A DAC may refer to a set of databases that have been configured to failover together. The set of databases may include, at any given time, one active (or primary) user database replica (UDR) and one or more passive (or secondary) UDRs. The active/primary UDR, at one point-in-time, may not necessarily be the same UDR at another point-in-time. That is, at a first point-in-time, a first UDR on a first physical appliance (i.e., a node) may be designated the active/primary UDR. However, at a second point-in-time, because the first physical appliance may have experienced failure, a second UDR on a second physical appliance may become the active/primary UDR in place of the first UDR. In general, the active/primary UDR operates in read-write (RW) mode, whereas the passive/secondary UDR(s) may be maintained in read-only (RO) mode. Accordingly, performing a differential database backup for the DAC translates to performing a differential database backup of the current active/primary UDR at the submission time of the request. Further, a differential database backup may entail replicating all changes made to the active/primary UDR since the last full database backup for the DAC, as well as changes since then made to the transaction log of the active/primary UDR.

In Step 502, the current active (or primary) database failover node (DFN) of the database failover cluster (DFC) (see e.g., FIG. 1) is identified. In one embodiment of the invention, a DFC may refer to a group of linked nodes—i.e., a set of DFNs—that work together to maintain high availability (or minimize downtime) of one or more applications and/or services. The set of DFNs may include, at any given time, one active (or primary) DFN and one or more standby (or secondary) DFNs. The active/primary DFN, at one point-in-time, may not necessarily be the same DFN at another point-in-time. That is, at a first point-in-time, a first DFN may be designated the active/primary DFN. However, at a second point-in-time, because the first DFN may have experienced failure, a second DFN may become the active/primary DFN in place of the first DFN. In one embodiment of the invention, which DFN is the current active/primary DFN of the DFC may be tracked using one or more in-memory data objects or structures residing on the CBS. Accordingly, identification of the current active/primary DFN of the DFC may entail performing a lookup on these one or more in-memory data objects/structures.

In Step 504, a lookup is performed on a cluster backup chain table (BCT) (see e.g., FIG. 2B), which may reside on the CBS. In one embodiment of the invention, the cluster BCT may represent a data object or structure for storing database backup chains pertinent to all UDRs in the DAC. Further, the lookup may be performed to identify a cluster backup chain record (BCR) therein that may be associated with a latest full database backup for the DAC. More specifically, the lookup may entail reviewing each cluster BCR in the cluster BCT in reverse chronological order until a cluster BCR, pertaining to a full database backup, is identified.

In Step 506, based on the lookup on the cluster BCT (performed in Step 504), a determination is made as to whether a cluster BCR, pertaining to a full database backup, has been identified. In one embodiment of the invention, identification pertaining to whether a cluster BCR may associate with a full database backup may entail assessing the backup ID specified therein. A backup ID may refer to a string of characters (e.g., letters, numbers, symbols, etc.) that may uniquely identify a database backup. Further, in one embodiment of the invention, the backup ID for each type of database backup may recite a subset of characters that may uniquely identify each type of database backup. For example, the first character expressed in each backup ID may be hard-fixed to identify the type of database backup— e.g., character 'F' for full database backups, character 'D' for differential database backups, and character 'T' for transaction log backups. Accordingly, if a cluster BCR, pertaining to a full database backup, is identified, then the process proceeds to Step 520 (see e.g., FIG. 5B). On the other hand, if no or zero cluster BCRs are identified as pertaining to a full database backup, then the process alternatively proceeds to Step 508.

In Step 508, after determining (in Step 506) that none of the existing cluster BCRs in the cluster BCT pertain to a full database backup, a full backup command (FBC) is issued. In one embodiment of the invention, the FBC may be directed to a cluster backup agent (CBA) executing on the current active/primary DFN (identified in Step 502), and may instruct the CBA to perform a full database backup of the user database replica (UDR) hosted thereon. That is, substantively, the full database backup is instructed to be performed rather than the differential database backup (requested in Step 500) because of the determined lack of any full database backups logged in the cluster BCT.

With regards to database backup and recovery in general, a full database backup tends to serve as a foundation for any other database backup types—i.e., differential database backups and/or transaction log backups. That is, differential database and transaction log backups are defined through their capture of changes in information consolidated in a database, where recovery of any particular database state that includes these changes requires a base database state— i.e., a full database backup—from which these changes can relate. Accordingly, a backup promotion transpires entailing the promotion of the requested differential database backup to the instructed full database backup, in order to capture that base database state critical to any subsequent database backups performed thereafter.

Turning to FIG. 5B, in Step 520, after determining (in Step 506) that a cluster BCR, pertaining to a full database backup, has been identified, a checkpoint log sequence number (LSN) (specified in the identified cluster BCR) is obtained therefrom. In one embodiment of the invention, the checkpoint LSN may refer to the LSN—i.e., a unique transaction identifier—of a latest checkpoint (described above) captured in the full database backup associated with the identified cluster BCR.

In Step 522, a database metadata query (DMQ) is issued. In one embodiment of the invention, the DMQ may be directed to the CBA executing on the current active/primary DFN (identified in Step 502), and may instruct the CBA to retrieve and relay back a value for a requested metadata variable. The requested metadata, specified in the DMQ, may be a differential base LSN (DBL). The DBL may refer to a metadata variable that stores the LSN of the latest checkpoint (described above) captured in the latest full database backup performed across all UDRs in the DAC. Further, the DBL may be retrieved, by the CBA, from a database metadata repository (DMR) hosted on the current active/primary DFN (see e.g., FIG. 3A). Thereafter, in Step 524, a database metadata answer (DMA) is received in response to the DMQ (issued in Step 522). In one embodiment of the invention, the DMA may represent a result set, to the DMQ, obtained and subsequently forwarded by the CBA of the current active/primary DFN (identified in Step 502). Further, the DMA may specify the DBL current value retrieved from the DMR.

In Step 526, a determination is made as to whether the checkpoint LSN (obtained in Step 520) matches the DBL (received via the DMA in Step 524). Recall that the checkpoint LSN was obtained from within an identified cluster BCR, which pertained to a latest full database backup that had been recorded in the cluster BCT. Further, in one embodiment of the invention, the cluster BCT represents a data object or structure that maintains all database backup chains for the subset of UDRs in the DAC that may be serviced by the CBS. Subsequently, the cluster BCT may log any and all updates to the database backup chain for the UDR residing on each DFN serviced by the CBS. In contrast, the cluster BCT may not maintain a record of updates to database backup chains pertaining to UDRs that may be serviced by one or more third-party backup services (TBS). The DBL, on the other hand, represents a metadata variable that stores the LSN of the latest checkpoint captured in the latest full database backup performed across all UDRs in the DAC—i.e., all UDRs meaning the superset that includes the subset, if not all UDRs, monitored by the CBS and the remaining subset monitored by one or more TBSs, should the CBS only service the aforementioned subset.

Substantively, in one embodiment of the invention, the obtained checkpoint LSN and the DBL should match when the latest full database backup, that has transpired across the DAC, had been performed for a UDR on a DFN serviced by the CBS. In such an embodiment, the process may proceed to Step 530. Conversely, in another embodiment of the invention, the obtained checkpoint LSN and the DBL may mismatch when the latest full database backup, that has transpired across the DAC, had been performed for a UDR on a DFN serviced by a TBS. Under this embodiment, the process may proceed to Step 528.

In Step 528, based on a determination (in Step 526) that the checkpoint LSN mismatches the DBL, a log gap is detected. In one embodiment of the invention, a log gap may refer to a break in the database backup chain for a database or, alternatively, for a set of databases such as the DAC. A break in the database backup chain may certainly lead to data loss should a differential database backup or a transaction log backup be pursued hereinafter. Subsequently, as a measure to protect against such data loss, a full database backup must transpire. Accordingly, a FBC is issued, thereby promoting the differential database backup (requested in Step 500) to a full database backup. In one embodiment of the invention, the FBC may be directed to the CBA of the current active/primary DFN (identified in Step 502), and may instruct the CBA to perform the aforementioned full database backup of the UDR hosted thereon.

In Step 530, based on an alternate determination (in Step 526) that the checkpoint LSN matches the DBL, there exists no break in the above-mentioned database backup chain. In one embodiment of the invention, without a break, there is no risk for data loss should the differential database backup (requested in Step 500) take place. Accordingly, a differential backup command (DBC) is issued. Further, the DBC may be directed to the CBA of the current active/primary DFN (identified in Step 502), and may instruct the CBA to perform the requested differential database backup of the UDR hosted thereon.

FIG. 6 shows a computing system in accordance with one or more embodiments of the invention. The computing system (600) may include one or more computer processors (602), non-persistent storage (604) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), a communication interface (612) (e.g., Bluetooth interface, infrared interface, network interface, optical interface, etc.), input devices (610), output devices (608), and numerous other elements (not shown) and functionalities. Each of these components is described below.

In one embodiment of the invention, the computer processor(s) (602) may be an integrated circuit for processing instructions. For example, the computer processor(s) may be one or more cores or micro-cores of a processor. The computing system (600) may also include one or more input devices (610), such as a touchscreen, keyboard, mouse, microphone, touchpad, electronic pen, or any other type of input device. Further, the communication interface (612) may include an integrated circuit for connecting the computing system (600) to a network (not shown) (e.g., a local area network (LAN), a wide area network (WAN) such as the Internet, mobile network, or any other type of network) and/or to another device, such as another computing device.

In one embodiment of the invention, the computing system (600) may include one or more output devices (608), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage (604), and persistent storage (606). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

Figure 7A:
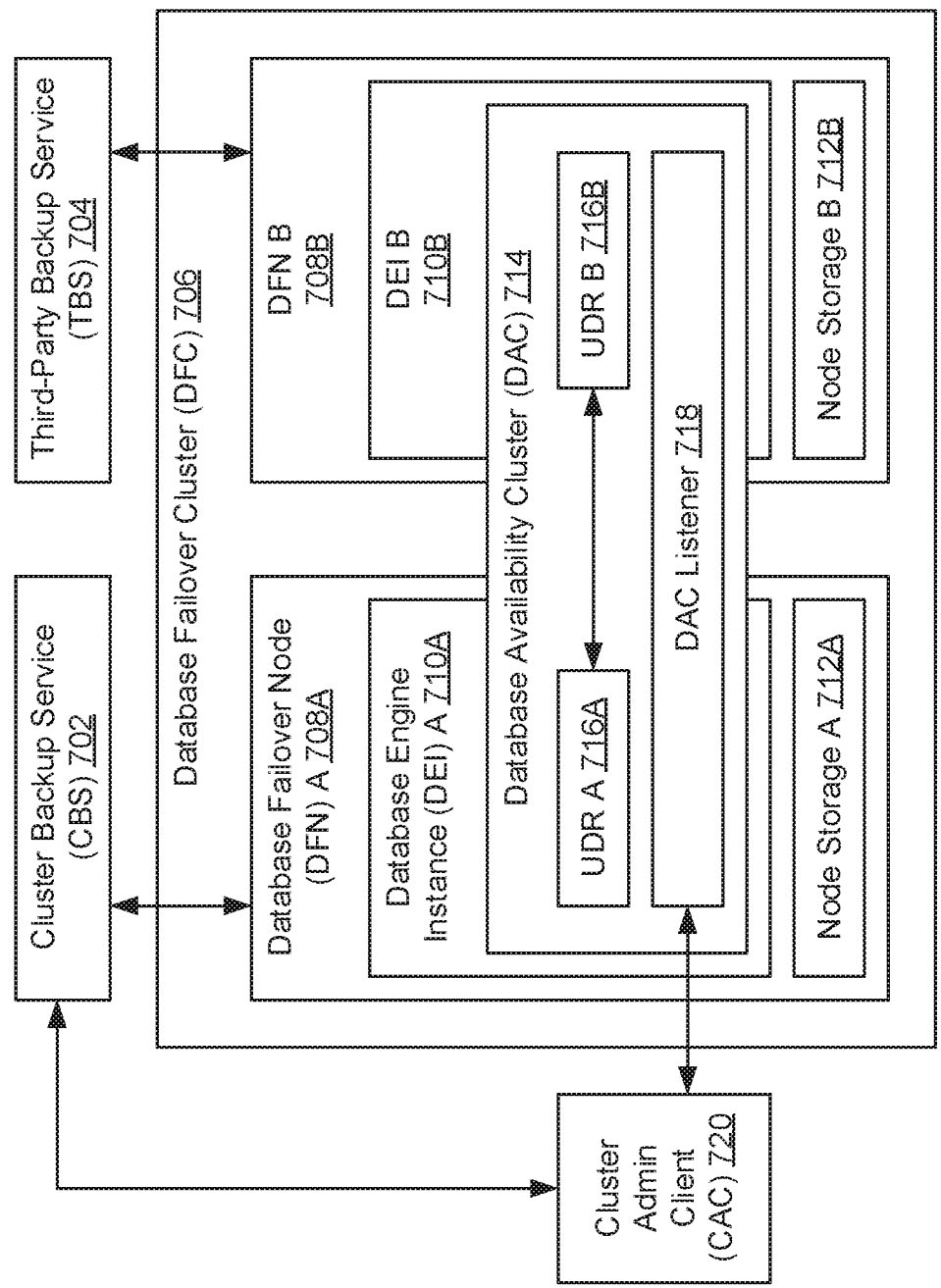
FIG. 7A shows an example system in accordance with one or more embodiments of the invention.
Figure 7B:
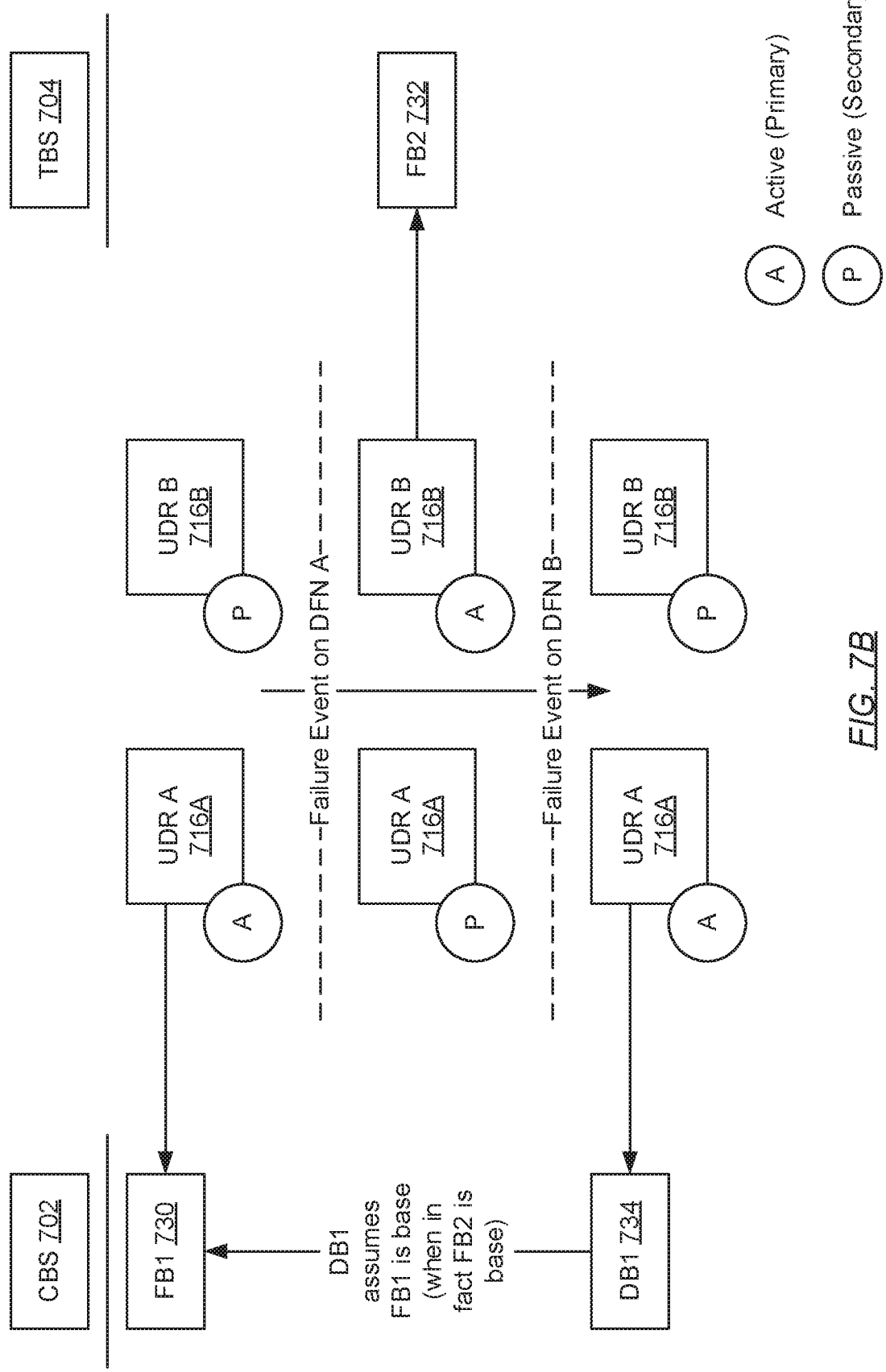
FIG. 7B shows an example scenario in accordance with one or more embodiments of the invention.

FIGS. 7A and 7B show an example system and an example scenario, respectively, in accordance with one or more embodiments of the invention. The following example, presented in conjunction with components shown in FIGS. 7A and 7B, is for explanatory purposes only and not intended to limit the scope of the invention.

Turning to FIG. 7A, the example system (700) includes a database failover cluster (DFC) (706) composed of two database failover nodes (DFNs) (708A, 708B). The first DFN (708A) is serviced by the cluster backup service (CBS) (702), whereas the second DFN (708B) is alternatively serviced by a third-party backup service (TBS) (704). Further, each DFN (708A, 708B) includes a database engine instance (DEI) (710A, 710B) and node storage (712A, 712B). Hosted on each DEI (710A, 710B) is a respective user database replica (UDR) (716A, 716B). The two UDRs (716A, 716B) form a database availability cluster (DAC) (714) across the DFC (706), where the DAC (714) also includes a DAC listener (718). Moreover, the example system (700) further includes a cluster admin client (CAC) (720), which is operatively connected to the CBS (702) and the DAC listener (718).

Turning to the example, consider the example scenario portrayed in FIG. 7B. FIG. 7B depicts a timeline that captures three points-in-time separated by two failure events. A first point-in-time takes place before a failure event occurring on the first DFN (708A), a second point-in-time takes place between the failure event occurring on the first DFN (708A) and another failure event occurring on the second DFN (708B), and a third point-in-time takes place after the failure event occurring on the second DFN (708B). Details pertaining to each point-in-time is described below.

During the first point-in-time (i.e., before the failure event on the first DFN (708A)), the first UDR (716A) residing on the first DFN (708A) assumes the role of the active (or primary) UDR of the DAC (714), whereas the second UDR (716B) residing on the second DFN (708B) assumes the role of the passive (or secondary) UDR of the DAC (714). Further, during the first point-in-time, a first database backup is requested to be taken of the DAC (714). In one embodiment of the invention, database backups are only taken from the active/primary UDR of the DAC (714) at any given time. Accordingly, because the first UDR (716A) is the current active/primary UDR, a database backup of the first UDR (716A) is to be performed.

Moreover, recall that the first DFN (708A), on which the first UDR (716A) resides, is serviced by the CBS (702). Also, recall that the first database backup for any database may always be a full database backup, thereby representing the base from which other database backup types—i.e., differential database and/or transaction log backups—may relate. Thus, in response to the first database backup request, a full database backup is taken of the first UDR (716A), thus representing the first full database backup (FB1) (730) for the DAC (714). FB1 (730) is subsequently consolidated on the CBS (702) and tracked via a cluster backup chain table (BCT) (see e.g., FIG. 2B) residing thereon.

Next, the failure event on the first DFN (708A) transpires, thereby transitioning the timeline to the second point-in-time. Because of the aforementioned failure event, the second UDR (716B) becomes the active/primary UDR of the DAC (714), while the first UDR (716A) becomes the passive/secondary UDR of the DAC (714). Thereafter, a second database backup request is submitted. Because the second UDR (716B) is the current active/primary UDR during the second point-in-time, a database backup of the second UDR (716B) is to be performed.

As mentioned above, the second DFN (708B), on which the second UDR (716B) resides, is serviced by the TBS (704). Thus, in response to the second database backup request and because the requested database backup would represent the first database backup for the second UDR (716B), a full database backup is taken of the second UDR (716B). This full database backup is representative of the second full database backup (FB2) (732) for the DAC (714). Further, FB2 (732) is consolidated, alternatively, on the TBS (704).

Hereinafter, the failure event on the second DFN (708B) transpires, thereby transitioning the timeline to the third point-in-time. Because of the aforementioned failure event, the first UDR (716A) becomes the active/primary UDR of the DAC (714) once again, while the second UDR (716B) reverts to being the passive/secondary UDR of the DAC (714). Now, during the third point-in-time, a third database backup request is submitted. This third database backup request pertains to the performance of a differential database backup (DB1) (734) since a full database backup—i.e., FB1 (730)—already exists for the first UDR (716A). Again, the first UDR (716A) is the current active/primary UDR, and therefore, the performance of DB1 (734) is directed to the first UDR (716A).

Without the invention, the base from which DB1 (734) relates is assumed to be FB1 (730) because FB1 (730) is recorded, on the CBS (702), as being the latest full database backup that has occurred for the DAC (714). This is also the case because the CBS (702) is unaware of FB2 (732), which is alternatively consolidated on the TBS (704). FB2 (732) captures an intermediate state of the DAC (714) from which the current state of the DAC (714), at the third point-in-time, depends. In creating DB1 (734) as a dependent of FB1 (730), as it would occur without the invention, the intermediate state—i.e., FB2 (732)—is lost and a log gap forms in the database backup chain.

Further, loss of the intermediate state would hinder the proper recovery of database information (e.g., data files and the transaction log). Looking at FIG. 7B in another light, FB1 (730) captures a first state of database information, FB2 (732) captures a second state of database information that includes a first set of changes incurred on the first state of database information, and DB1 (734) captures a third state of database information that includes a second set of changes incurred on the second state of database information. Subsequently, the current state of database information (i.e., at the third point-in-time) results from the incurrence of first and second sets of changes over the root database information state (i.e., FB1 (730)). Similarly, for proper recovery of the aforementioned current state, backups covering the root database information, as well as the aforementioned sets of changes, in the appropriate order (i.e., FB1 (730)→FB2 (732)→DB1 (734)), are essential. Accordingly, with the loss of the intermediate state (i.e., FB2 (732) capturing the first set of changes), the aforementioned order of backups necessary to properly restore the current database information state is disrupted.

Alternatively, with embodiments of the invention, at the receipt of the request to perform DB1 (734), any impending data loss is averted. Specifically, first, a cluster backup chain record (BCR) for FB1 (730), in the cluster BCT on the CBS (702), is identified. From therein, a checkpoint log sequence number (LSN) is obtained. Next, a query is submitted to the first DFN (708A) to retrieve a differential base LSN (DBL) stored thereon. The DBL stores the checkpoint LSN of the latest full database backup performed across all UDRs of the DAC (714). Per this example scenario, the latest full database backup performed across the DAC (714), at the third point-in-time, is FB2 (732). Accordingly, the DBL stores the checkpoint LSN for FB2 (732).

From here, the checkpoint LSN for FB1 (730) (obtained from the identified cluster BCR) is compared against the checkpoint LSN for FB2 (732) (stored in the DBL). Based on the comparison, it would be discovered that the checkpoint LSN for FB1 (730) mismatches the checkpoint LSN for FB2 (732). Because of this mismatching, a log gap is detected, which results in the promotion of the requested DB1 (734) to a third full database backup (FB3) (not shown) for the DAC (714). In promoting DB1 (734) to FB3, no data loss is recorded in the database backup chain. FB3 is subsequently consolidated on the CBS (702) and tracked via the cluster BCT on the CBS (702).

Embodiments of the invention relate to intelligent log gap detection to ensure necessary backup promotion. Specifically, a method and system for detecting log gaps, across high availability databases, through differential backups has been disclosed herein. Current methodologies, in contrast, may detect log gaps through transaction log backups; however, as of yet, no current methodology focuses on log gap detection through differential backups. Further, the intelligent log gap detection disclosed herein averts data loss across the high availability databases.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for intelligent log gap detection, comprising:
    receiving a first database backup request for a first differential database backup on a database availability cluster (DAC);
    making a first determination that a first full database backup has already been performed, wherein making the first determination comprises:
        performing a search of a cluster backup chain table (BCT) in reverse chronological order, wherein the cluster BCT comprises a plurality of cluster backup chain records (BCRs); and
        identifying a cluster BCR of the plurality of cluster BCRs based on a backup identifier (ID) specified therein, wherein the backup ID identifies the cluster BCR as being associated with a full database backup;
    obtaining, based on the first determination, a checkpoint log sequence number (LSN) associated with the first full database backup;
    making a second determination that the checkpoint LSN mismatches a first differential base LSN (DBL);
    detecting, based on the second determination, a log gap across the DAC;
    promoting, based on the detecting the log gap, the first differential database backup to a second full database backup; and
    issuing, based on the promoting, a full backup command (FBC).

2. The method of claim 1, wherein the cluster BCR comprises an object ID, the backup ID, a first LSN, a last LSN, the checkpoint LSN, and a database backup LSN.

3. The method of claim 1, further comprising:
    receiving a second database backup request for a second differential database backup on the DAC;
    making a third determination that the checkpoint LSN matches a second DBL;
    detecting, based on the third determination, no log gap across the DAC; and
    issuing, based on the detecting no log gap and pursuant to the second database backup request, a differential backup command (DBC).

4. A system, comprising:
a processor, wherein the processor is executing a cluster backup service (CBS) programmed to:
receive a database backup request specifying performance of a first differential database backup on a database availability cluster (DAC);
make a first determination that a first full database backup has already been performed, wherein making the first determination comprises:
performing a search of a cluster backup chain table (BCT) in reverse chronological order, wherein the cluster BCT comprises a plurality of cluster backup chain records (BCRs); and
identifying a cluster BCR of the plurality of cluster BCRs based on a backup identifier (ID) specified therein, wherein the backup ID identifies the cluster BCR as being associated with a full database backup;
obtain, based on the first determination, a checkpoint log sequence number (LSN) associated with the first full database backup;
make a second determination that the checkpoint LSN mismatches a differential base LSN (DBL);
detect, based on the second determination, a log gap across the DAC;
promote, based on detecting the log gap, the first differential database backup to a second full database backup; and
issue, based on the promoting, a full backup command (FBC) to a cluster backup agent (CBA) operatively connected to the CBS.

5. The system of claim 4, further comprising:
a first user database replica (UDR) operatively connected to the CBA, wherein the CBA is programmed to:
create, in response to the FBC, the second full database backup of the first UDR.

6. The system of claim 5, wherein the first UDR comprises a data partition and a log partition, wherein the log partition comprises a replica BCT.

7. The system of claim 5, further comprising:
a database engine instance (DEI) comprising the first UDR, a database metadata repository (DMR), and at least one engine system database (ESD), wherein the DMR comprises the DBL.

8. The system of claim 7, further comprising:
a first database failover node (DFN) comprising the CBA and the DEI.

9. The system of claim 8, further comprising:
a plurality of DFNs comprising the first DFN and a second DFN,
wherein the second DFN comprises a third-party backup agent (TBA) operatively connected to a second UDR.

10. The system of claim 9, wherein the CBS comprises a cluster BCT for tracking a database backup chain for each DFN in at least a subset of the plurality of DFNs.

11. The system of claim 9, further comprising:
a third-party backup service (TBS) operatively connected to the TBA, wherein the TBS consolidates database backups generated by the TBA.

12. The system of claim 9, further comprising:
a database failover cluster (DFC) comprising the plurality of DFNs and the DAC,
wherein the DAC comprises a plurality of UDRs and a DAC listener,
wherein the plurality of UDRs comprises the first UDR and the second UDR.

13. The system of claim 12, further comprising:
a cluster admin client (CAC) operatively connected to the DAC listener and the CBS,
wherein the database backup request is submitted by the CAC.

14. A non-transitory computer readable medium (CRM) comprising computer readable program code, which when executed by a computer processor, enables the computer processor to:
receive a first database backup request specifying performance of a first differential database backup on a database availability cluster (DAC);
make a first determination that a first full database backup has already been performed, wherein to make the first determination, the computer readable program, which when executed by the computer processor, enables the computer processor to
perform a search of a cluster backup chain table (BCT) in reverse chronological order, wherein the cluster BCT comprises a plurality of cluster backup chain records (BCRs); and
identify a cluster BCR of the plurality of cluster BCRs based on a backup identifier (ID) specified therein, wherein the backup ID identifies the cluster BCR as being associated with a full database backup;
obtain, based on the first determination, a checkpoint log sequence number (LSN) associated with the first full database backup;
make a second determination that the checkpoint LSN mismatches a first differential base LSN (DBL);
detect, based on the second determination, a log gap across the DAC;
promote, based on detecting the log gap, the first differential database backup to a second full database backup; and
issue, based on the promoting, a full backup command (FBC).

15. The non-transitory CRM of claim 14, further comprising computer readable program code, which when executed by the computer processor, enables the computer processor to:
receive a second database backup request specifying performance of a second differential database backup on the DAC;
make a third determination that the checkpoint LSN matches a second DBL;
detect, based on the third determination, no log gap across the DAC; and
issue, based on detecting no log gap and pursuant to the second database backup request, a differential backup command (DBC).

* * * * *